(12) United States Patent
Yoshida et al.

(10) Patent No.: US 7,806,793 B2
(45) Date of Patent: Oct. 5, 2010

(54) CONTINUOUSLY VARIABLE BELT DRIVE TRANSMISSION

(75) Inventors: Makoto Yoshida, Kanagawa (JP); Yoshiaki Katou, Kanagawa (JP); Yasuo Ito, Kanagawa (JP); Nobuo Kino, Yokohama (JP)

(73) Assignee: Jatco Ltd, Fuji-shi (JP)

( * ) Notice: Subject to any disclaimer, the term of this patent is extended or adjusted under 35 U.S.C. 154(b) by 1155 days.

(21) Appl. No.: 11/086,666

(22) Filed: Mar. 23, 2005

(65) Prior Publication Data
US 2005/0221938 A1    Oct. 6, 2005

(30) Foreign Application Priority Data
Mar. 26, 2004 (JP) ............................. 2004-091984
Mar. 11, 2005 (JP) ............................. 2005-069942

(51) Int. Cl.
*F16H 9/12* (2006.01)
*F16H 55/56* (2006.01)
*F16G 5/16* (2006.01)

(52) U.S. Cl. ................... 474/188; 474/240; 474/249

(58) Field of Classification Search ............... 474/8, 474/237–238, 249–250, 240, 242, 188, 91, 474/175, 272; 29/894; 82/1.11
See application file for complete search history.

(56) References Cited

U.S. PATENT DOCUMENTS 4,947,533 A * 8/1990 Taniguchi et al. ............. 29/894

5,011,461 A    4/1991 Brouwers (Continued)

FOREIGN PATENT DOCUMENTS

DE    101 50 315 A1    12/2002
JP    62-184270 A    8/1987

(Continued)

OTHER PUBLICATIONS

"Surface roughness—Definitions and designation", Japanese Industrial Standard (JIS B 0601), Feb. 1994, pp. 1-8, 14-16.

(Continued)

*Primary Examiner*—Robert A Siconolfi
*Assistant Examiner*—Anna Momper
(74) *Attorney, Agent, or Firm*—Foley & Lardner LLP

(57) ABSTRACT

A continuously variable belt drive transmission, including input and output pulleys each having axially opposed tapered surfaces, and an endless belt including a plurality of metal elements each having opposed side faces contacted with the respective tapered surfaces of the input and output pulleys. Each of the opposed side faces is formed with a plurality of microscopic projections and recesses arranged along a radial direction of the input and output pulleys upon being in contact with the respective tapered surfaces of the input and output pulleys. The tapered surfaces of at least the input pulley are formed with microgrooves that are radially spaced from one another and have a pitch not more than a width of each of the microscopic projections on the side faces of the metal element.

20 Claims, 9 Drawing Sheets

U.S. PATENT DOCUMENTS

| | | | |
|---|---|---|---|
| 5,829,135 A | 11/1998 | Koneda et al. | |
| 6,045,474 A * | 4/2000 | Smeets et al. | 474/249 |
| 6,254,503 B1 * | 7/2001 | Chiba et al. | 474/8 |
| 6,290,397 B1 | 9/2001 | Hashimoto | |
| 2002/0183152 A1 * | 12/2002 | Kobayashi | 474/22 |

FOREIGN PATENT DOCUMENTS

| | | | |
|---|---|---|---|
| JP | 62184270 A * | 8/1987 | |
| JP | 05-010405 A | 1/1993 | |
| JP | 10-115349 A | 5/1998 | |
| JP | 2001-065651 A | 3/2001 | |
| JP | 3209323 B2 | 7/2001 | |
| JP | 2002-139114 A | 5/2002 | |

OTHER PUBLICATIONS

Makoto Yoshida, U.S. PTO Office Action, U.S. Appl. No. 11/086,665, Jan. 29, 2009, 14 pages.

DIN EN ISO 4287: Oberflächenbeschaffenheit: Tastschnittverfahren, Oct. 1998, p. 7.

M. Yoshida, U.S. PTO Office Action, U.S. Appl. No. 11/086,665, dated Mar. 16, 2010, 10 pages.

U.S. PTO Office Action, U.S. Appl. No. 11/086,665, dated Aug. 21, 2009, 9 pages.

U.S. Appl. No. 11/086,665, filed Mar. 23, 2005, Yoshida et al.

* cited by examiner

US 7,806,793 B2

CONTINUOUSLY VARIABLE BELT DRIVE TRANSMISSION

BACKGROUND OF THE INVENTION

The present invention relates to a continuously variable belt drive transmission, and more particularly to a microstructure on a surface of a pulley which is in contact with a belt.

Japanese Patent No. 3209323 describes a metal element of an endless belt for continuously variable belt drive transmissions. The metal element has a side face adapted to be in contact with tapered surfaces of input and output pulleys, on which microscopic recesses and projections are formed in order to increase friction coefficients of the side face of the metal element and the tapered surfaces of the input and output pulleys.

SUMMARY OF THE INVENTION

However, a sufficient friction coefficient is not ensured even when the recesses and projections are formed merely on the side face of the metal element of the belt as described in the conventional art. Basically, in the continuously variable belt drive transmissions, if slide occurs between contact portions of the tapered surface of the input or output pulley and the side face of the metal element of the belt in a direction of rotation of the input and output pulleys, it becomes difficult to transmit a driving torque from an engine to an output side parts. For this reason, in order to prevent the occurrence of slide, a force, hereinafter referred to as pulley thrust, is applied to the input and output pulleys so as to control a width of a V-shaped groove between pulley halves of the respective input and output pulleys. Especially, at a low gear ratio, slide between the tapered surface of the input or output pulley and the side faces of the metal elements tends to occur due to a small contact area therebetween and a large input torque on a small-diameter side of the tapered surface of the input pulley. Therefore, the pulley thrust must be set considerably large. This requires high hydraulic pressure to produce the large pulley thrust, causing increase in load of an oil pump, and therefore, deterioration in fuel economy. According to the above conventional art, generally, coefficient of dynamic friction caused between the respective pulleys and the metal element of the belt is 0.1-0.12. There is a demand to improve the coefficient of dynamic friction for the purpose of further enhancing the fuel economy.

An object of the present invention is to provide a continuously variable belt drive transmission capable of improving a friction coefficient of the mutually contacting surfaces of the belt and the pulleys to thereby enhance fuel economy. A further object of the present invention is to provide a continuously variable belt drive transmission capable of improving abrasion resistance of side faces of a metal element of the belt which are contacted with tapered surfaces of the pulleys, and to stabilizing the friction coefficient of the mutually contacting surfaces of the belt and the pulleys by preventing variation in the surface roughness of the tapered surfaces of the pulleys with passage of time.

In one aspect of the present invention, there is provided a continuously variable belt drive transmission, comprising:
an input pulley having tapered surfaces opposed to each other in an axial direction of the input pulley;
an output pulley having tapered surfaces opposed to each other in an axial direction of the output pulley; and
an endless belt including a plurality of metal elements each having opposed side faces contacted with the respective tapered surfaces of the input and output pulleys, each of the opposed side faces being formed with a plurality of microscopic projections and recesses arranged along a radial direction of the input and output pulleys upon being in contact with the respective tapered surfaces of the input and output pulleys,
wherein the tapered surfaces of at least the input pulley are formed with microgrooves radially spaced from one another, the microgrooves having a pitch not more than a width of each of the microscopic projections on the side faces of the metal element.

DETAILED DESCRIPTION OF THE INVENTION

Figure 1A:
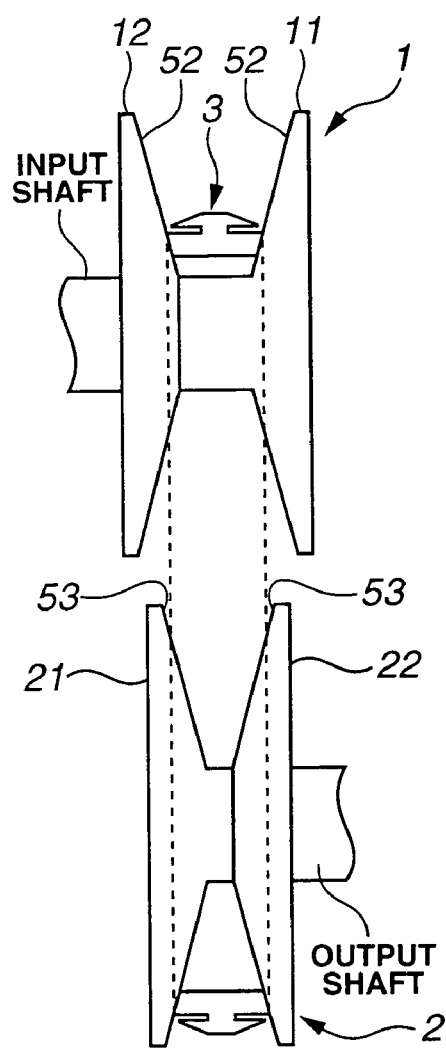
FIG. 1A is a schematic front view of a continuously variable belt drive transmission, showing input and output pulleys to which the present invention is applicable.
Figure 1B:
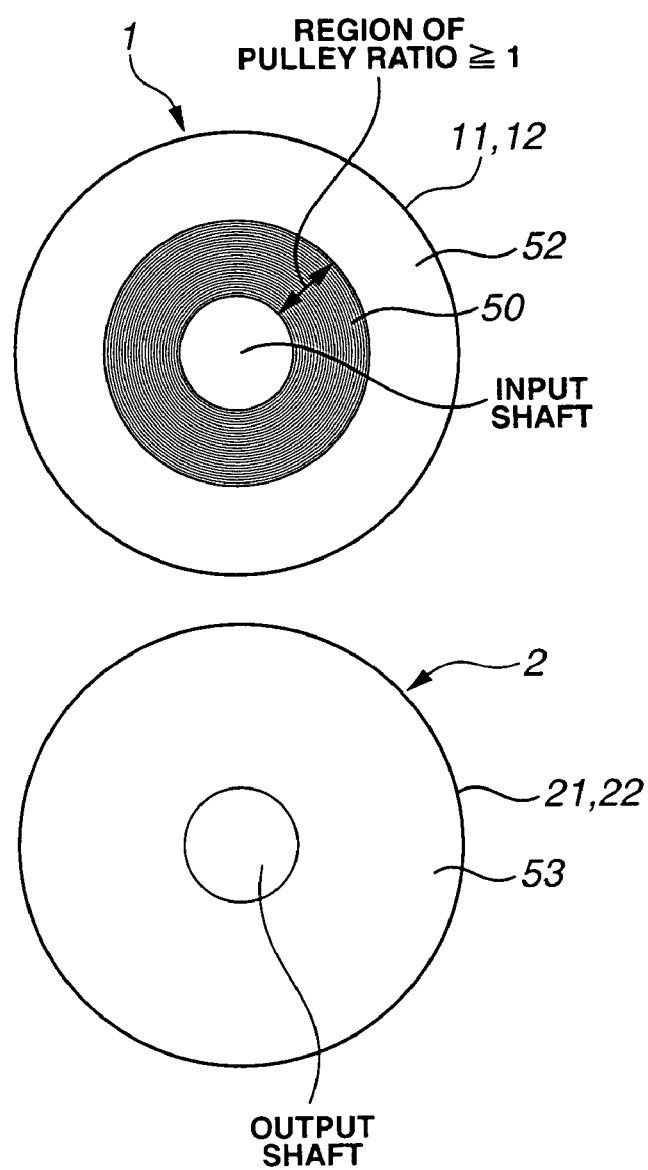
FIG. 1B is a side view of input and output pulleys for the continuously variable belt drive transmission, according to the present invention.

In the followings, embodiments of the present invention will be described with reference to the accompanying drawings. FIG. 1A schematically illustrates a relative arrangement of primary pulley 1, secondary pulley 2 and endless belt 3 of a continuously variable belt drive transmission (hereinafter referred to as a belt drive CVT). FIG. 1B illustrates primary pulley 1 on an input shaft and secondary pulley 2 on an output shaft as viewed in an axial direction of the input and output shafts. As illustrated in FIG. 1A, primary pulley 1 as an input pulley is constructed of stationary pulley half 11 formed integrally with the input shaft, and moveable pulley half 12 moveable in an axial direction of the input shaft. Similarly, secondary pulley 2 as an output pulley is constructed of stationary pulley half 21 formed integrally with the output shaft, and moveable pulley half 22 moveable in an axial direction of the output shaft. Endless belt 3 is fitted between primary and secondary pulleys 1 and 2 and engaged in a V-shaped groove between stationary pulley half 11 and moveable pulley half 12 of primary pulley 1 and in a V-shaped groove between stationary pulley half 21 and moveable pulley half 22 of secondary pulley 2. The respective V-shaped grooves are defined by opposed tapered surfaces 52 of pulley halves 11 and 12 of primary pulley 1 and opposed tapered surfaces 53 of pulley halves 21 and 22 of secondary pulley 2. Tapered surfaces 52 are tapered toward a common axis of pulley halves 11 and 12, namely, an axis of primary pulley 1, and opposed to each other in the axial direction of primary pulley 1. Tapered surfaces 53 are tapered toward a common axis of pulley halves 21 and 22, namely, an axis of secondary pulley 2, and opposed to each other in the axial direction of secondary pulley 2. Endless belt 3 transmits input rotation of the input shaft to the output shaft. A width of each of the V-shaped grooves is variably controlled in relation to pulley thrust. The thus-constructed belt drive CVT continuously and variably changes a gear ratio.

Figure 2:
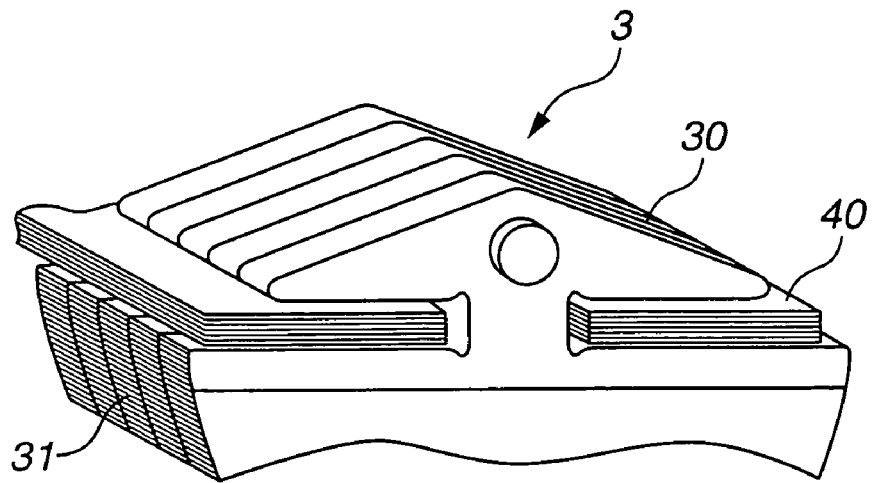
FIG. 2 is an enlarged perspective view of a part of a belt of the continuously variable belt drive transmission.

Referring to FIG. 2, there is shown a part of endless belt 3. Endless belt 3 includes a plurality of plate-shaped metal elements 30 stacked on each other in a thickness direction thereof, and a plurality of laminated metal rings 40 supporting metal elements 30 thereon. Each of metal elements 30 has side faces 31 opposed and spaced in a length direction substantially perpendicular to the thickness direction, one of which is shown in FIG. 2. Side faces 31 are contacted with tapered surfaces 52 of stationary pulley half 11 and moveable pulley half 12 of primary pulley 1 and tapered surfaces 53 of stationary pulley half 21 and moveable pulley half 22 of secondary pulley 2 as shown in FIG. 1A.

Figure 3:
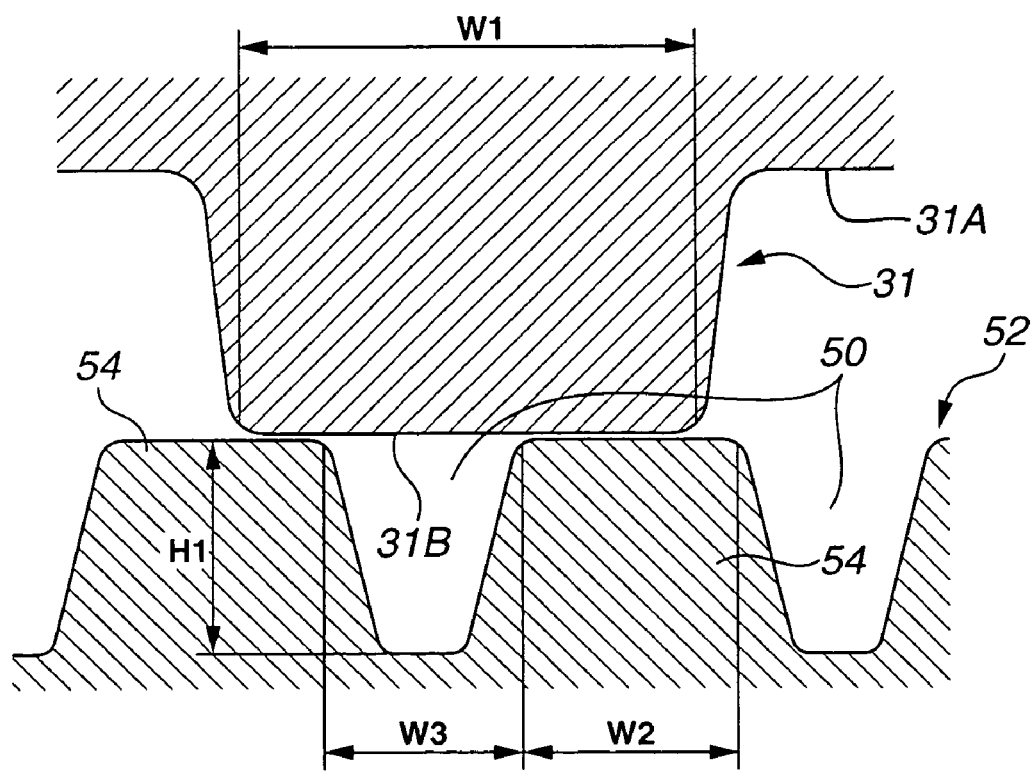
FIG. 3 is an enlarged schematic cross-section of microstructures of mutually contacting surfaces of the input pulley and a metal element of the belt shown in FIG. 2.

FIG. 3 is an enlarged cross-sectional view of microstructures formed on respective side faces 31 of metal element 30 and respective tapered surfaces 52 of pulley halves 11 and 12 of primary pulley 1 which are in mutual contact with each other, taken along a radial direction of primary pulley 1. Each of side faces 31 of metal element 30 has microscopic recesses 31A and projections 31B which are formed along the thickness direction of metal element 30, namely, along a circumferential direction of pulley halves 11 and 12 of primary pulley 1 upon being in contact with tapered surface 52 of each of pulley halves 11 and 12. With the provision of recesses 31A and projections 31B, lubrication oil is allowed to appropriately discharge from the tapered surface in a rotational direction of primary pulley 1. This results in avoidance of reduction in friction between endless belt 3 and primary pulley 1 due to so-called surfing effect.

Tapered surface 52 of each of pulley halves 11 and 12 of primary pulley 1 is formed with concentric microgrooves 50 as shown in FIG. 1B. The shape of microgrooves 50 on tapered surfaces 52 of pulley halves 11 and 12 of primary pulley 1 is optional as long as they are arranged in a substantially radially equidistantly spaced relation to each other. For instance, microgrooves 50 may be in the form of a helical groove.

As illustrated in FIG. 3, a plurality of microprojections 54 are defined between microgrooves 50 on tapered surfaces 52 of pulley halves 11 and 12 of primary pulley 1. Thus, microgrooves 50 and microprojections 54 are alternately arranged in the radial direction of primary pulley 1. In FIG. 3, W1 represents a width of a top surface of each of projections 31B which extends in a direction perpendicular to the thickness direction and the length direction of metal element 30; W2 represents a width of a top surface of each of microprojections 54 which extends in the radial direction of primary pulley 1; W3 represents a width of each of microgrooves 50; and H1 represents a height of microprojections 54, i.e., a depth of microgrooves 50. Specifically, the width W3 is a radial distance between the top surfaces of the adjacent microprojections 54, namely, between both end peripheries of microgroove 50 opposed in the radial direction of primary pulley 1. A pitch between respective microgrooves 50 is represented by Sm that is a sum of the width W2 of microprojection 54 and the width W3 of microgroove 50, namely, Sm=W2+W3. Tapered surface 52 of each of pulley halves 11 and 12 of primary pulley 1 has a microstructure in which surface roughness Ra is in a range of 0.05-0.25 µm, height H1 of microprojection 54 is in a range of 0.5-2.5 µm, and pitch Sm of microgrooves 50 is 30 µm or less.

Recesses 31A and projections 31B on side faces 31 of metal element 30 and microgrooves 50 on tapered surfaces 52 of pulley halves 11 and 12 of primary pulley 1 are formed such that the sum of the width W2 of microprojection 54 and the width W3 of microgroove 50, namely, pitch Sm of microgrooves 50, is not more than the width W1 of projection 31B. More specifically, at any contact position between metal element 30 and tapered surfaces 52 of pulley halves 11 and 12 of primary pulley 1, one or more microgrooves 50 are always located opposed to one projection 31B.

Side faces 31 of metal element 30 are basically contacted with tapered surfaces 52 of pulley halves 11 and 12 of primary pulley 1 and tapered surfaces 53 of pulley halves 21 and 22 of secondary pulley 2 through an oil film. The oil film includes a torque-transmitting film that is adsorbed by additive components contained in the lubrication oil to generate a shear force, and a lubrication film functioned as a lubrication oil. Therefore, in order to adequately control the oil film, it is required to form the torque-transmitting film while discharging a suitable amount of an oil constituting the lubrication film from the contact portion between side faces 31 of metal element 30 and tapered surfaces 52 and 53 of primary pulley 1 and secondary pulley 2. In this embodiment of the present invention, each of projections 31B having width W1 on side faces 31 of metal element 30 is always opposed to at least one of microgrooves 50 on tapered surfaces 52 of primary pulley 1 through which the amount of oil constituting the lubrication film can be discharged. As a result, discharge of the amount of oil constituting the lubrication film from tapered surface 52 can be enhanced, and the torque-transmitting film can be efficiently formed. This ensures a suitable contact between side faces 31 of metal element 30 and tapered surfaces 52 of primary pulley 1 and increases a friction coefficient thereof.

As shown in FIG. 1B, microgrooves 50 are formed on a radially inward region of tapered surface 52 of each pulley halves 11 and 12 of primary pulley 1 where a pulley ratio is 1 or more. The reason therefor is as follows. That is, in the radially inward region where the formula of pulley ratio≧1 is satisfied, the torque applied to the pulleys becomes large since the radius of contact between endless belt 3 and primary pulley 1 is small, so that a torque shared by individual metal element 30 is increased. Owing to forming microgrooves 50 in such a minimum area, i.e., the radially inward region of tapered surface 52, the high friction coefficient can be attained, and at the same time, the number of processing steps can be reduced. As a matter of course, microgrooves 50 may be formed on other areas of tapered surface 52 of primary pulley 1 in addition to the radially inward region satisfying the formula of pulley ratio≧1. Further, microgrooves 50 may be formed on a radially outward region of tapered surface 53 of secondary pulley 2 which is located outside a region corresponding to the radially inward region of tapered surface 52 of primary pulley 1 satisfying the formula of pulley ratio≧1.

Method of measuring surface roughness Ra and pitch Sm of microgrooves:

A method of measuring surface roughness Ra and pitch Sm of microgrooves which are used in the present invention, will be explained hereinafter.

The surface roughness Ra is arithmetical mean roughness Ra as defined in JIS B 0601-1994. The arithmetical mean roughness Ra is the value obtained in the manner as described in JIS B 0601-1994. Namely, a part of a roughness curve of a surface of an object which corresponds to reference length L is sampled in the direction of mean line of the roughness curve. Absolute values of deviation of the sampled part from the mean line are summed, and then a mean value of the sum of the absolute values is calculated.

The pitch Sm of microgrooves is mean spacing of profile irregularities Sm as defined in JIS B 0601-1994. The mean spacing of profile irregularities Sm is the value obtained in the manner as described in JIS B 0601-1994. Namely, a part of a roughness curve of a surface of an object which corresponds to reference length L is sampled in the direction of mean line of the roughness curve. Within the sampled part, segment lengths of the mean line which correspond to one profile peak and one profile valley adjacent to the one profile peak are summed, and then a mean value of the sum of the segment lengths is calculated.

The above-described surface roughness Ra and pitch Sm of microgrooves are measured under the following conditions.

Measuring apparatus: Form Talysurf S5 manufactured by Taylor Hobson

Measuring length: 5 mm

Evaluation length: 4 mm

Cut-off: 0.8 mm

Filter: Gaussian

Bandwidth: 100:1

Radius of stylus tip: 2 μm

Test for evaluation of various parameters defining microstructure of tapered surface of pulley:

The microstructure of the tapered surfaces of the pulley capable of accomplishing the above effects is defined by parameters, i.e., surface roughness Ra, pitch Sm of microgrooves and height H1 of microprojection. These parameters Ra, Sm and H1 will be explained in detail later. In this evaluation test, a metal element of the belt was prepared, in which the pitch of microscopic projections and recesses on side faces of the metal element was about 200 μm, and the width W1 of the microscopic projections was about 30 μm. A plurality of test specimens of the pulley which had various ranges of surface roughness Ra and pitch Sm of microgrooves were prepared. The thus-prepared metal element of the belt and test specimens of the pulley were used in the test. In the test, while contacting the metal element with the surfaces of the test specimen under a load of 392 N, the metal element was continuously slid over the surface of the test specimen so as to move up and down relative to the surface thereof at a speed of 0 to 0.8 m/s in a CVT lubrication oil having an oil temperature of 110° C. to measure friction coefficient μ thereof upon the down slide movement. The above test condition corresponds to Low-gear ratio upon mounting the belt drive CVT to actual vehicles.

Figure 4:
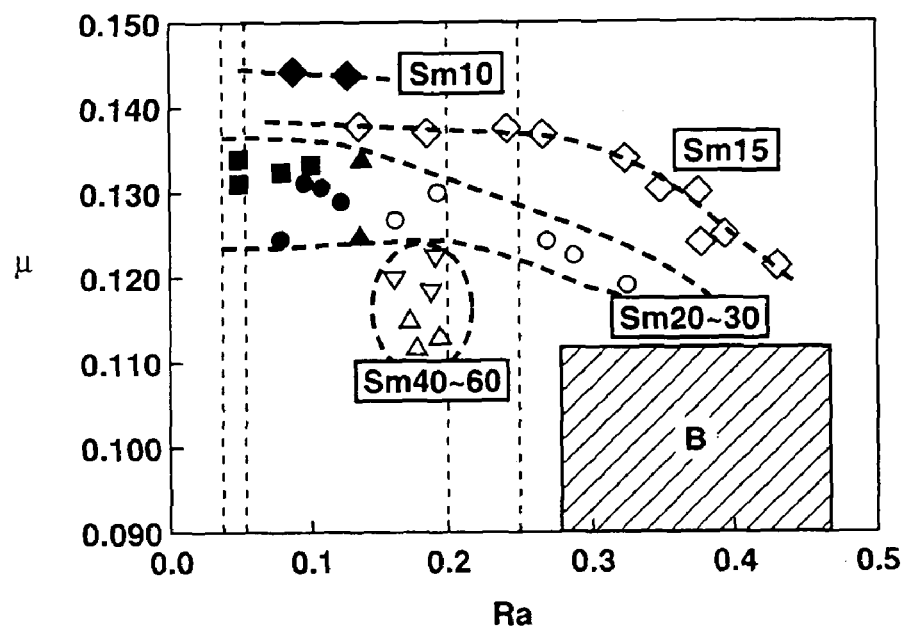
FIG. 4 is a diagram illustrating a relationship between surface roughness Ra and friction coefficient μ of the pulley surface of test specimens used in a slide test.

Surface roughness Ra:

FIG. 4 illustrates a relationship between surface roughness Ra and friction coefficient μ of the test specimens. In FIG. 4, the friction coefficient μ measured at the speed of 0.7 m/s in the test was used. Marks (○) represent the results of measurement of the friction coefficient μ of the test specimen prepared in Comparative Example 1 by subjecting the surface thereof to grinding. Marks (●) represent the results of measurement of the friction coefficient μ of the test specimen prepared in Example 1 by subjecting the surface thereof to grinding and then roller burnishing to control height H1 of microprojection and decrease the surface roughness Ra. Marks (□) represent the results of measurement of the friction coefficient μ of the test specimen prepared in Comparative Example 2 by subjecting the surface thereof to shot peening using shots having a diameter of 0.05 mm to control the surface roughness Ra thereof. Marks (■) represent the results of measurement of the friction coefficient μ of the test specimen prepared in Example 2 by subjecting the surface thereof to shot peening using shots having a diameter of 0.03 mm to control the surface roughness Ra thereof. Marks (▲) represent the results of measurement of the friction coefficient μ of the test specimen prepared in Example 3 by subjecting the surface thereof to shot peening using shots having a diameter of 0.05 mm and then subjected to film lapping to control the surface roughness Ra thereof. Marks (■) represent the results of measurement of the friction coefficient μ of the test specimen prepared in Example 4 by subjecting the surface thereof to grinding and then to film lapping to control the surface roughness Ra thereof. Marks (◇) represent the results of measurement of the friction coefficient μ of the test specimen prepared in Comparative Example 3 by subjecting the surface thereof to hard turning to form microgrooves having a pitch Sm of 15 μm. Marks (◆) represent the results of measurement of the friction coefficient μ of the test specimen prepared in Example 5 by subjecting the surface thereof to hard turning to form microgrooves having a pitch Sm of 10 μm.

Figure 10:
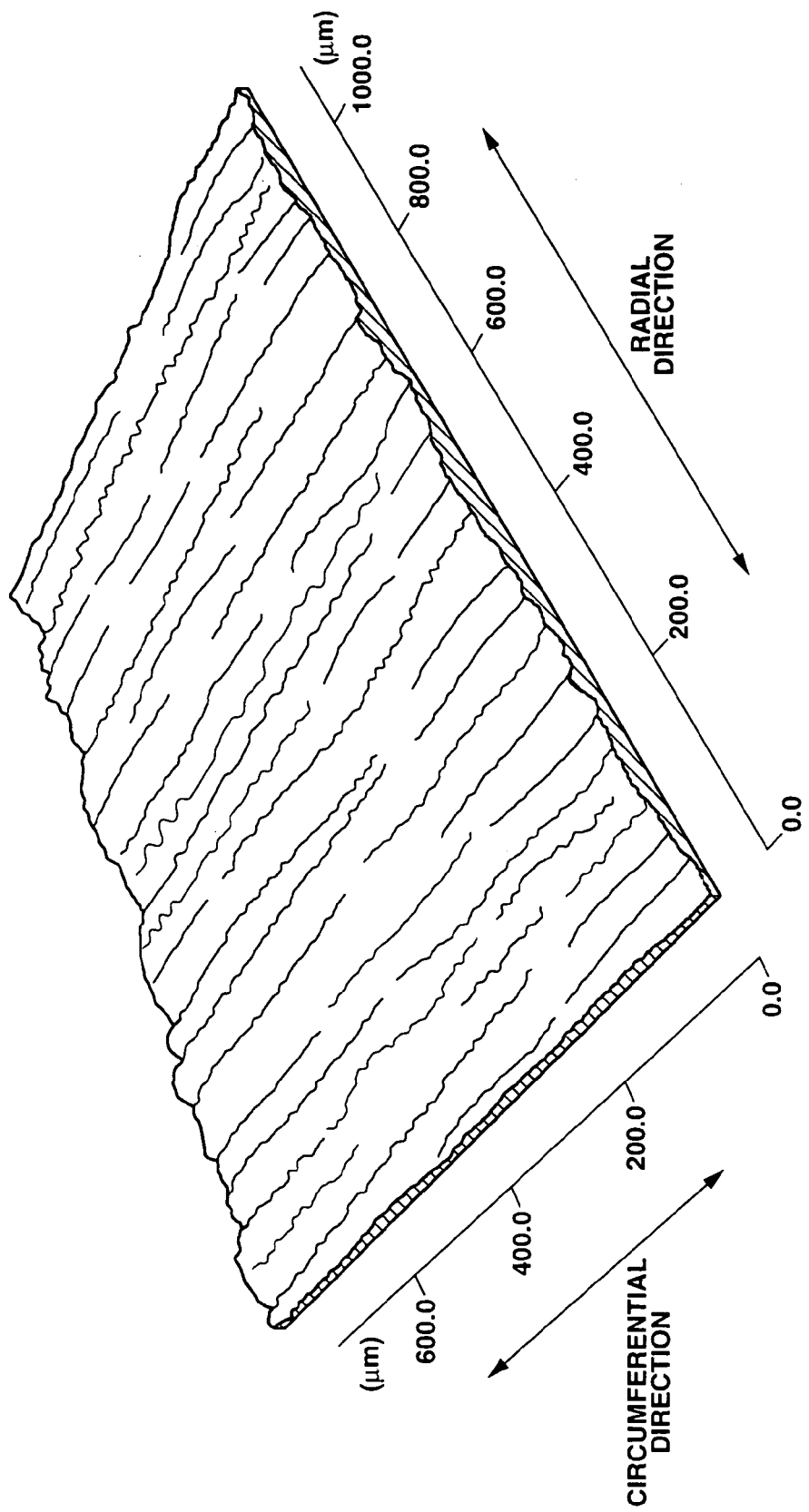
FIG. 10 is a three-dimensional bird's-eye view showing a microstructure of a surface of one of the test specimens used in the slide test.
Figure 11:
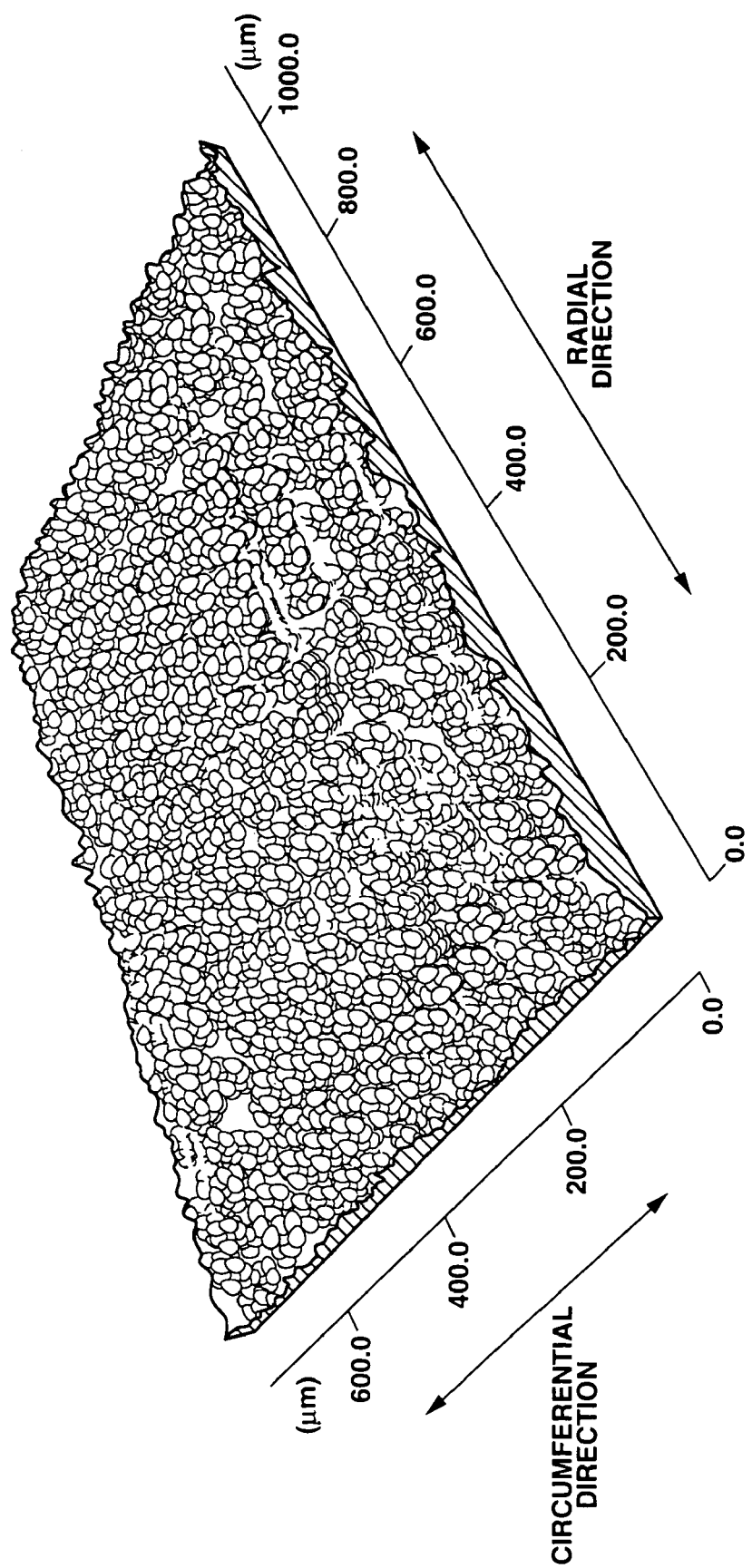
FIG. 11 is a view similar to FIG. 10, but showing a microstructure of a surface of the test specimen different from that shown in FIG. 10.
Figure 12:
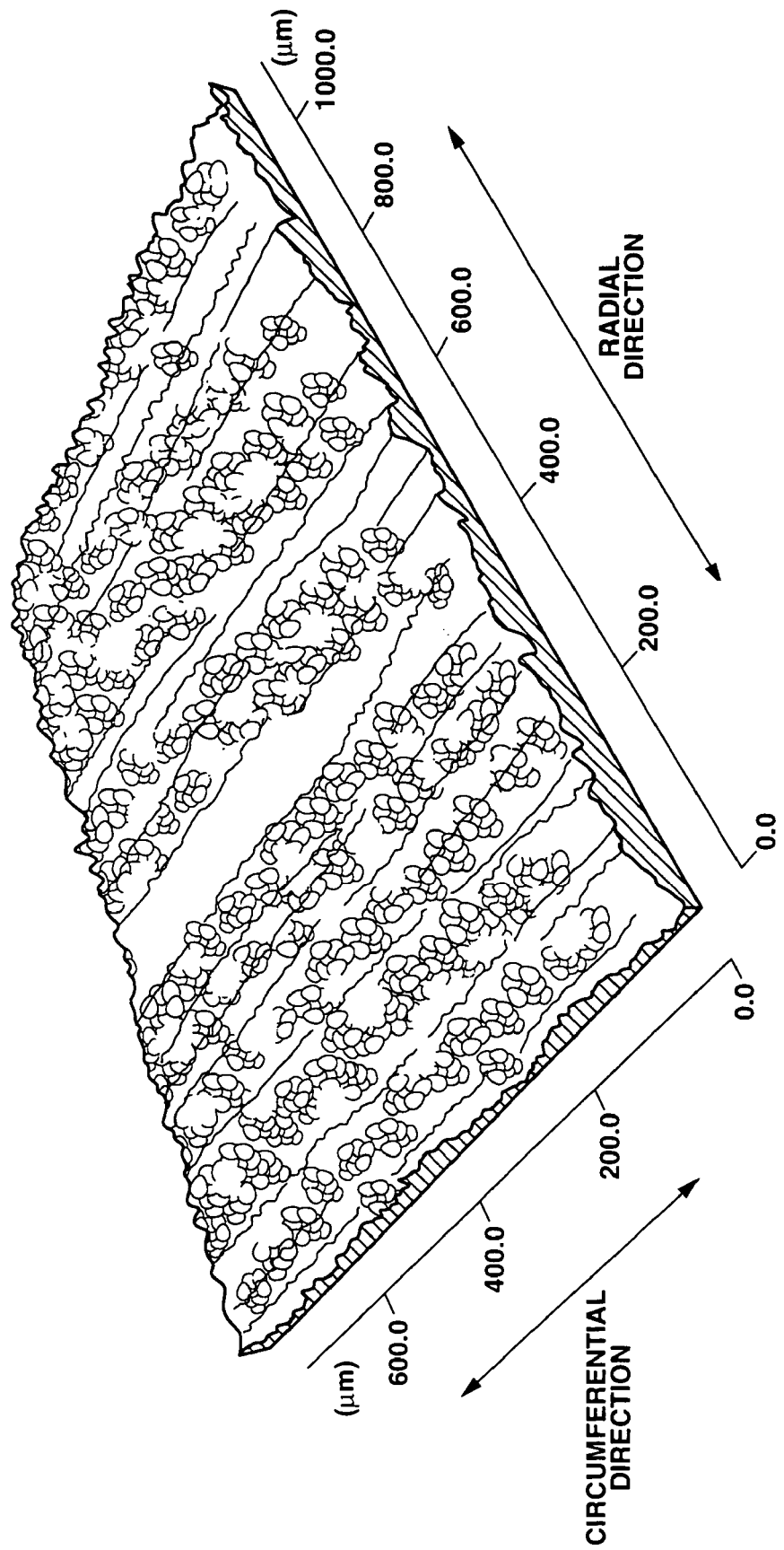
FIG. 12 is a view similar to FIG. 10, but showing a microstructure of a surface of the test specimen different from that shown in FIG. 10.
Figure 13:
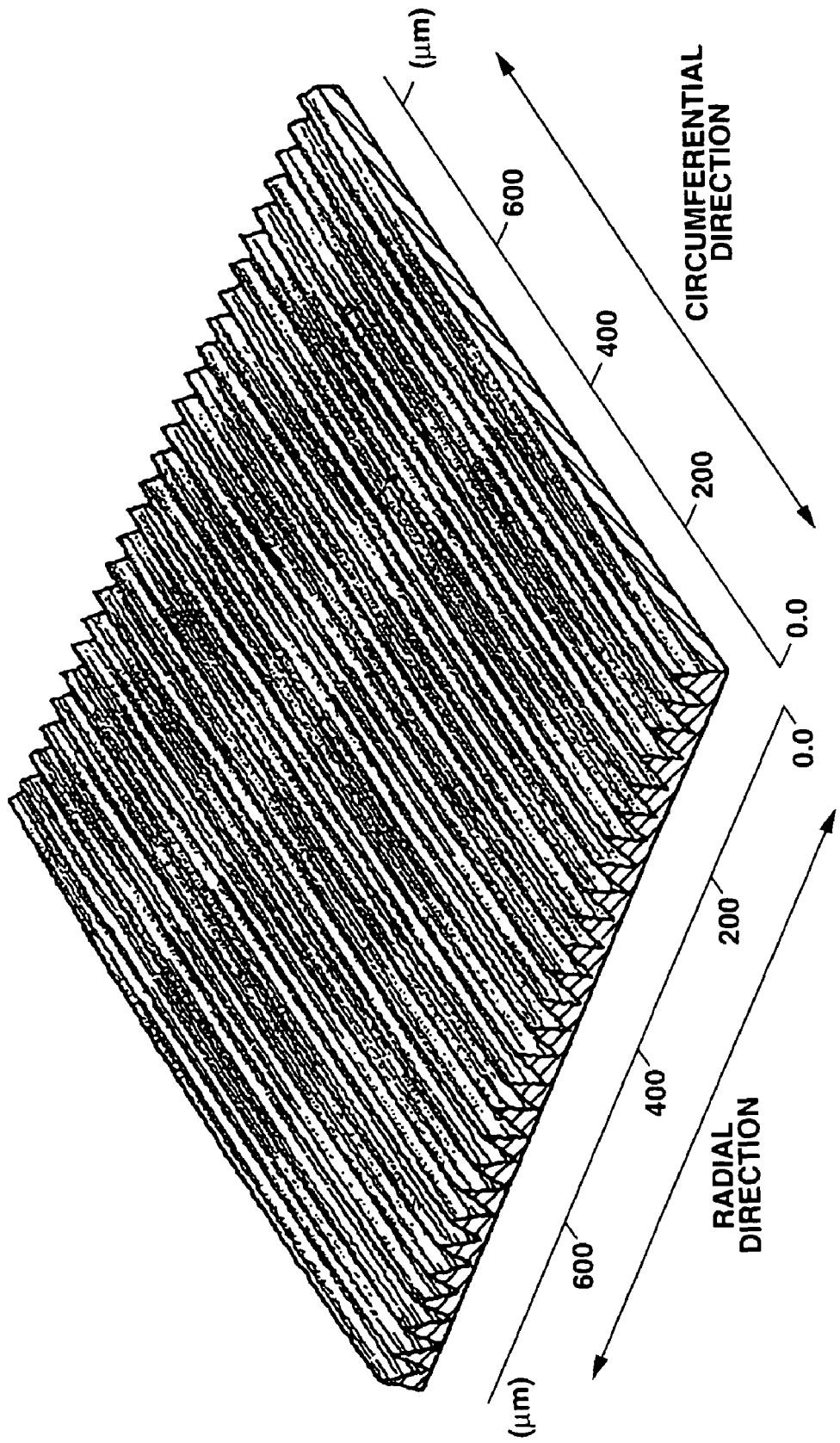
FIG. 13 is a view similar to FIG. 10, but showing a microstructure of a surface of the test specimen different from that shown in FIG. 10.

FIG. 10 is a three dimensional birds-eyes view (perspective view) showing a microstructure of the surface of the test specimen as indicated by the marks (○) in FIG. 4. FIG. 11 is a three dimensional birds-eyes view (perspective view) showing a microstructure of the surface of the test specimen as indicated by the marks (Δ) in FIG. 4. FIG. 12 is a three dimensional birds-eyes view (perspective view) showing a microstructure of the surface of the test specimen as indicated by the marks (▲) in FIG. 4. FIG. 13 is a three dimensional birds-eyes view (perspective view) showing a microstructure of the surface of the test specimen as indicated by the marks (◆) in FIG. 4.

Surface roughness Ra is given as the value obtained by determining a region in a surface profile which includes microprojections and microgrooves located above a mean line of heights of the microprojections when folding back the microgrooves on the mean line, and then dividing an area per unit length of the region by the length. Accordingly, surface roughness Ra, and pitch Sm of the microgrooves, and height H1 of the microprojection generally have the relationship represented by the following formula:

$$Ra = k \cdot f(Sm) \cdot g(H1),$$

wherein f and g respectively represent a function showing an average value that is determined by a shape of the microgrooves; and k represents a constant. Basically, as Sm is increased, f(Sm) is increased, and as H1 is increased, g(H1) is increased.

Comparison between the process using grinding solely and that using both grinding and roller burnishing:

In the conventional arts as shown by hatched portion B in FIG. 4, the surface roughness Ra was 0.28 or more and the friction coefficient μ thereof was less than 0.113. Whereas, as shown by the marks (◯) in FIG. 4 in which the test specimen was subjected to grinding solely, it is understood that when the surface roughness Ra of the surface formed with the microgrooves is reduced to 0.25 or less, the friction coefficient μ can be improved.

In comparison with the test specimen subjected to grinding solely as shown by the marks (◯) in FIG. 4, it was recognized that the friction coefficient μ was further improved in the test specimen which was subjected to both of grinding and roller burnishing to reduce the height H1 of the microprojection and the surface roughness Ra of the surface formed with the microgrooves, specifically $0.05 \leqq Ra \leqq 0.25$, as shown by the marks (●) in FIG. 4. Meanwhile, the roller burnishing process for controlling the height H1 of the microprojection serves for not only reducing the surface roughness Ra, but also appropriately smoothening the top surface of the microprojection on the surface. As a result, the area ensuring formation of the torque transmitting film is increased, thereby enabling the friction coefficient μ thereof to be improved. If the surface roughness Ra is less than 0.05, the microgrooves tend to be deteriorated in the effect of discharging the lubrication oil from the tapered surface. Therefore, the surface roughness Ra is preferably 0.05 or larger, i.e., $Ra \geqq 0.05$. Meanwhile, the height H1 of the microprojection corresponding to the above surface roughness Ra is in the range of 0.5 to 2.5 μm. Therefore, the microgrooves are preferably formed such that the height H1 of the microprojection lies in this range.

Comparison between the process using grinding solely and that using both grinding and film lapping:

In comparison with the test specimen subjected to grinding solely as shown by the marks (◯) in FIG. 4, it was recognized that the friction coefficient μ was further improved in the test specimen which was subjected to not only grinding but also film lapping to reduce the height H1 of the microprojection and the surface roughness Ra of the surface formed with the microgrooves, specifically $0.03 \leqq Ra \leqq 0.2$, as shown by the marks (■) in FIG. 4. If the surface roughness Ra is less than 0.03, the microgrooves tend to be deteriorated in the effect of discharging the lubrication oil from the tapered surface. Therefore, the surface roughness Ra is preferably 0.03 or larger, i.e., $Ra \geqq 0.03$. Meanwhile, the height H1 of the microprojection corresponding to the above range of the surface roughness Ra is in the range of 0.5 to 2.5 μm. Therefore, the microgrooves are preferably formed such that the height H1 of the microprojection lies in this range.

Comparison between the process using shot peening solely and that using both shot peening and film lapping:

In comparison with the test specimens subjected to shot peening using the diameters of the shots of 0.05 mm and 0.03 mm, respectively, it was recognized that the friction coefficient μ was improved though the surface roughness Ra was not largely changed as shown by the marks (△) and (▽) in FIG. 4. Also, it was recognized that when the test specimen was subjected to shot peening using the 0.05 mm φ shots and then to film lapping, the friction coefficient μ was increased as shown by the marks (▲) in FIG. 4, as compared to the friction coefficient μ of the test specimen subjected to shot peening using smaller 0.03 mm φ shots as shown by the marks (▽) in FIG. 4. The reason therefor is considered to be that the film lapping process ensures formation of the torque transmitting film while adequately discharging the lubrication oil from the tapered surfaces. As shown in FIG. 12, the microgrooves similar to those shown in FIG. 10 are formed on the surface of the test specimen by both shot peening and film lapping.

Meanwhile, it is recognized that upon comparison under the same surface roughness Ra, the friction coefficient μ of the surface obtained by both shot peening and film lapping was more excellent than that obtained by shot peening solely.

As explained above, the friction coefficient μ of the surface is considerably enhanced by reducing the surface roughness Ra. It is understood that the friction coefficient μ can be improved by controlling the surface roughness Ra in the range of 0.05-0.25 μm and in the range of 0.03-0.2 μm using various methods.

Figure 6:
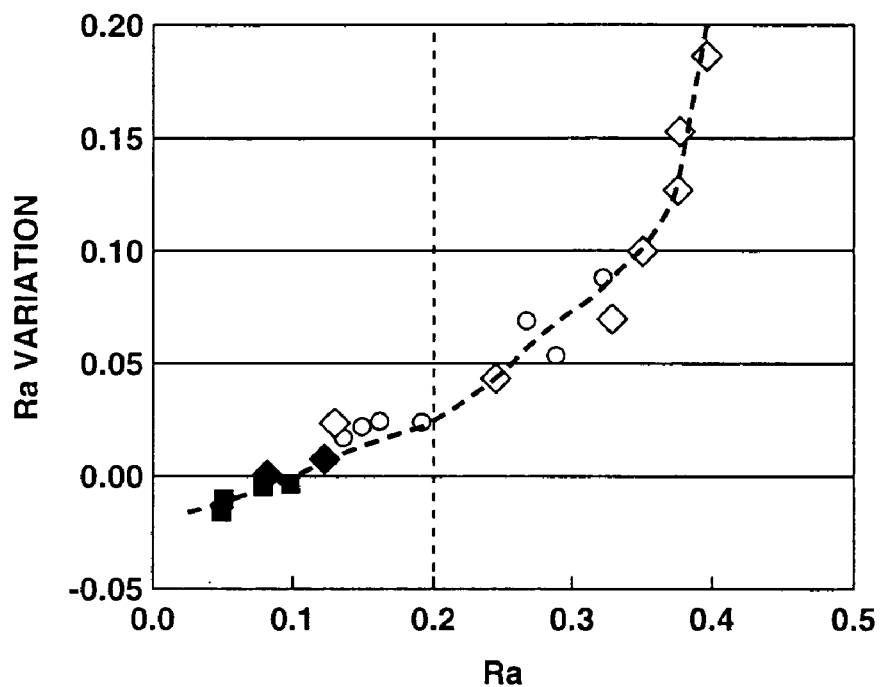
FIG. 6 is a diagram illustrating a relationship between initial surface roughness Ra and variation in surface roughness Ra of the test specimens between before and after the slide test.

FIG. 6 illustrates a relationship between initial surface roughness Ra of the test specimen and surface roughness Ra variation between before and after the above-described test. In FIG. 6, the marks (◯), (■), (◇) and (◆) denote surface roughness Ra variation measured in the test specimen subjected to grinding, the test specimen subjected to both grinding and film lapping, the test specimen subjected to hard turning to provide the pitch Sm of 15 μm, and the test specimen subjected to hard turning to provide the pitch Sm of 10 μm, respectively. As shown in FIG. 6, when the surface roughness Ra of the test specimen is 0.2 or less, the surface roughness Ra variation, namely, variation in the surface roughness Ra with passage of time is lowered. It is understood that not only abrasion of the pulley but also variation in the surface profile and the surface roughness Ra with passage of time can be suppressed by controlling the surface roughness Ra to 0.2 or less. This stabilizes the friction coefficient μ that is considerably influenced by the surface roughness Ra as explained above.

Figure 7:
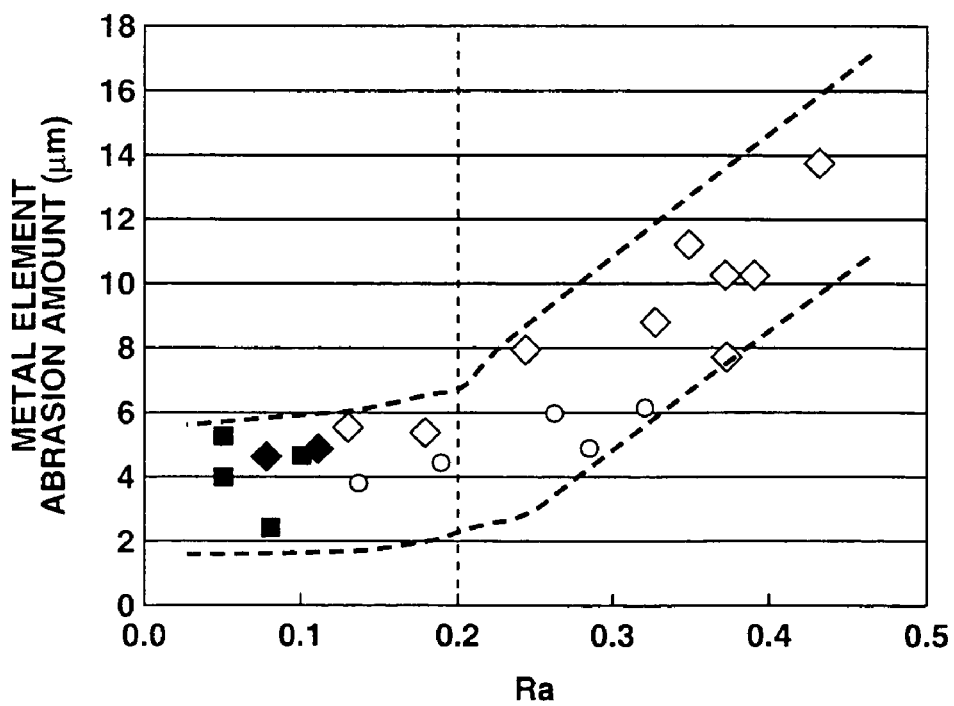
FIG. 7 is a diagram illustrating a relationship between initial surface roughness Ra of the test specimens and abrasion amount of microscopic projections of the metal element which was measured after the slide test.

FIG. 7 illustrates a relationship between initial surface roughness Ra of the test specimen and an abrasion amount of the microscopic projections of the metal element of the belt which was measured after finishing the above-described test. In FIG. 7, the marks (◯), (■), (◇) and (◆) denote surface roughness Ra variation measured in the test specimen subjected to grinding, the test specimen subjected to both grinding and film lapping, the test specimen subjected to hard turning to provide the pitch Sm of 15 μm, and the test specimen subjected to hard turning to provide the pitch Sm of 10 μm, respectively. As shown in FIG. 7, when the surface roughness Ra of the test specimen is 0.2 or less, the abrasion amount of the microscopic projections of the metal element is reduced. Accordingly, it is understood that if the surface roughness Ra of the tapered surfaces of the pulley is controlled to 0.2 or less, abrasion of the pulley and variation in the surface profile and the surface roughness Ra with passage of time can be suppressed, and abrasion resistance of the metal element can be improved.

Pitch Sm:

Referring back to FIG. 4, the friction coefficients μ of the test specimens obtained in Examples 1-5 and Comparative Examples 1-3 are classified into 4 groups on the basis of 4 ranges of pitch Sm of the microgrooves. As seen from FIG. 4, it was recognized that even under the condition of the same surface roughness Ra, the friction coefficient μ is increased as the pitch Sm decreases.

Figure 5:
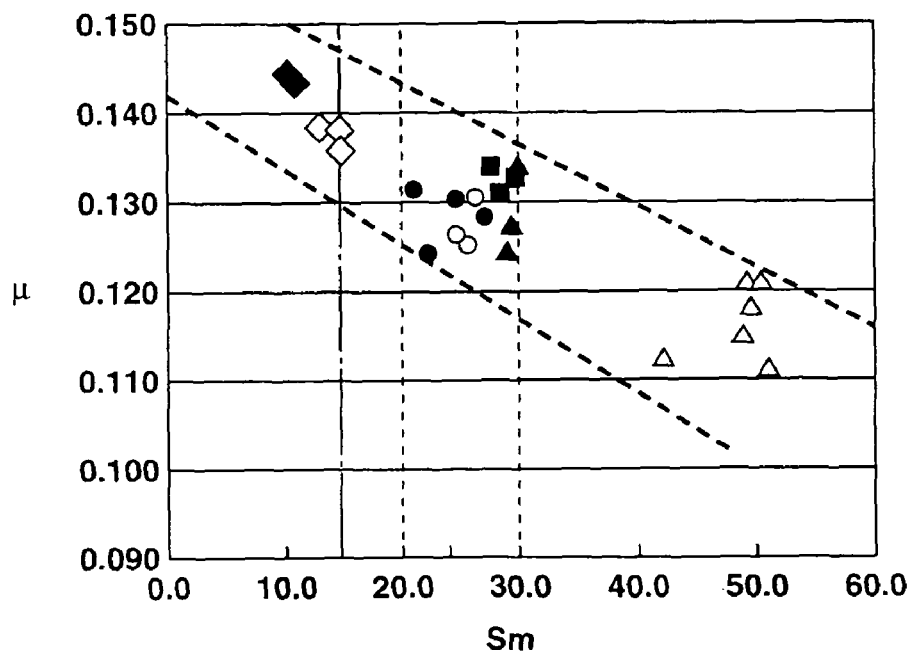
FIG. 5 is a diagram illustrating a relationship between pitch Sm and friction coefficient μ of the pulley surface of the test specimens used in the slide test.

FIG. 5 shows a relationship between pitch Sm of microgrooves and friction coefficient μ of the test specimens under the condition of surface roughness Ra<0.25. In FIG. 5, the marks (◯), (●), (△), (▽), (▲), (■), (◇), (◆) are used to denote the measurement results of the same test specimens as explained in FIG. 4. It was recognized that a sufficient friction coefficient μ was not ensured in the test specimen subjected to shot peening solely to have an average pitch Sm of more than 40 μm as shown by the marks (△) in FIG. 5. On the contrary, it was recognized that the friction coefficient μ was increased as shown by the marks (▲) in FIG. 5 in the test specimen subjected to both shot peening and film lapping to control the pitch Sm to about 30 μm.

Further, it was recognized that the friction coefficient μ was considerably increased as shown by the marks (◇) and (◆) in FIG. 5 in the test specimens subjected to hard turning to control the pitch Sm of the microgrooves to a small value, specifically, 20 μm or less and 15 μm or less. It is understood that the friction coefficient μ can be enhanced by suitably controlling the surface roughness Ra and controlling the pitch Sm of the microgrooves to about 30 μm, and preferably to 20 μm or less, and more preferably to 15 μm or less. The method of controlling the pitch Sm of the microgrooves is not limited to hard turning and may be precision grinding and the like.

In addition, the roller burnishing or the film lapping performed after forming the microgrooves by grinding basically gives an influence on not the pitch Sm of the microgrooves but the height H1 of the microprojection. Therefore, the pitch Sm of the microgrooves obtained by roller burnishing is indicated as the substantially same value (30 μm or less) as shown by the marks (●) and (■). As a result, it is understood that when the microgrooves are formed on the surface by hard turning or grinding, a suitable surface microstructure can be produced by appropriately controlling both the surface roughness Ra thereof and the pitch Sm of the microgrooves.

Comparison between the process using grinding solely and that using hard turning:

As shown in FIG. 5, the friction coefficient μ was enhanced in the respective test specimens subjected to hard turning to control the pitch Sm of the microgrooves to 15 μm and 10 μm as indicated by the marks (◇) and (◆), in comparison with the test specimen subjected to grinding solely as indicated by the marks (○).

Figure 8A:
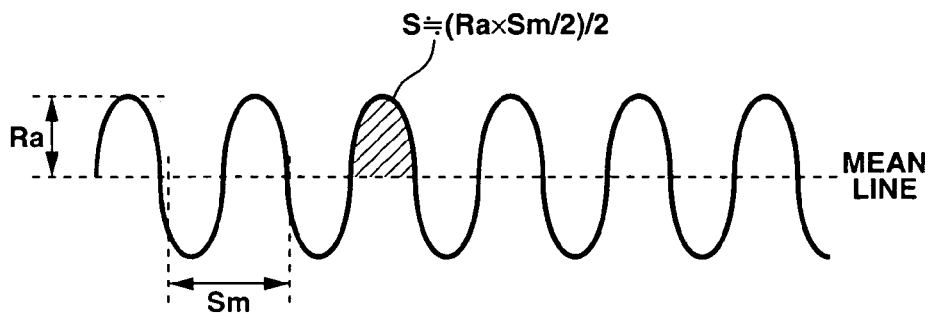
FIGS. 8A and 8B are schematic diagrams each illustrating a cross-sectional profile of a surface of the pulley surface.
Figure 8B:
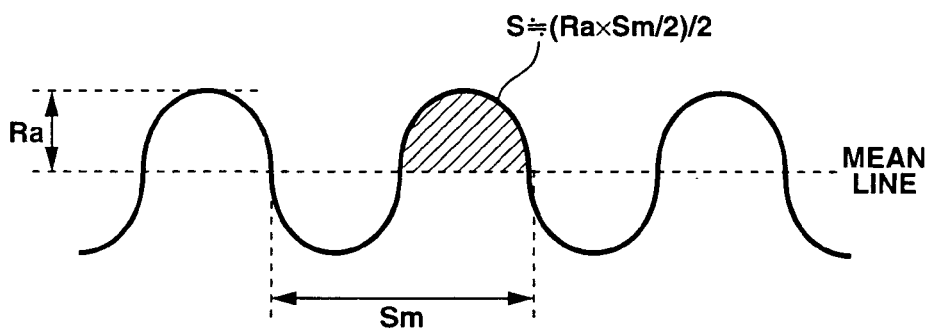

Ra×Sm/4:

FIGS. 8A and 8B schematically illustrate profiles of the tapered surfaces of the pulley. In FIGS. 8A and 8B, a cross-sectional area S of one projection on each of the profiles which is contacted with the metal element is expressed by the following formula:

$$S \approx (Ra \times Sm/2)/2$$

namely, $S \approx Ra \times Sm/4$

Figure 9:
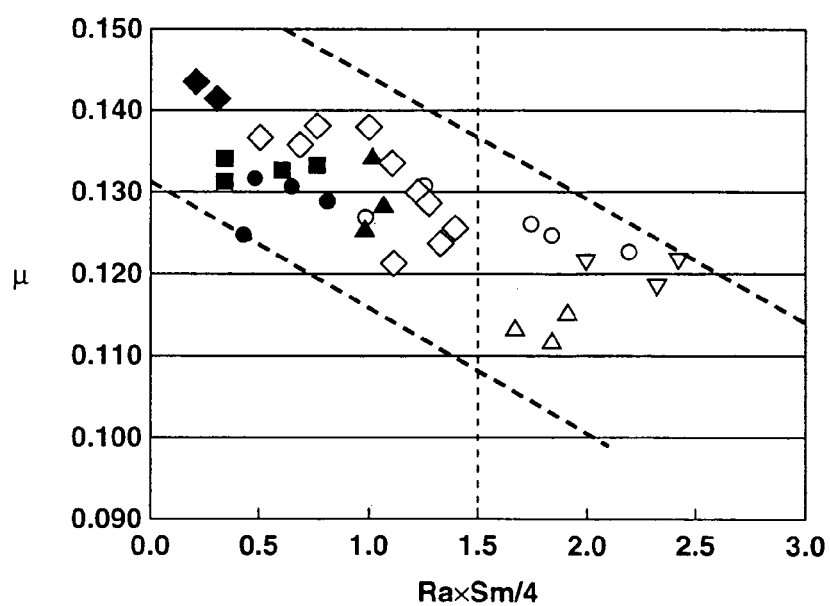
FIG. 9 is a diagram illustrating a relationship between a cross-sectional area Ra×Sm/4 of one projection of the profile and friction coefficient μ of a surface of the pulley of the present invention.

FIG. 9 illustrates a relationship between the cross-sectional area S, namely, Ra×Sm/4, of the projection on the profile and the friction coefficient μ. In FIG. 9, the marks (○), (●), (△), (▽), (▲), (■), (◇), (◆) are used to denote the measurement results of the same test specimens as explained in FIG. 4. It was understood from FIG. 9 that as the cross-sectional area S, i.e., Ra×Sm/4, of the projection on the profile of the test specimen became small, the friction coefficient μ was increased. Further, it was recognized that the friction coefficient μ was remarkably improved by controlling the cross-sectional area S, i.e., Ra×Sm/4, to less than 1.5

The function and effect of the microstructure of the surface of the pulley according to the present invention will be explained hereinafter.

(1) As shown in FIG. 3, concentric or helical microgrooves 50 are formed on tapered surface 52 of primary pulley 1 such that a sum of the width W3 of microgroove 50 and the width W2 of microprojection 54, namely, the pitch Sm of microgrooves 50, is not more than the width W1 of projection 31B formed on side face 31 of metal element 30 of belt 3. With this arrangement, one or more microgrooves 50 are surely disposed in an opposed relation to projection 31B of metal element 30, thereby ensuring smooth discharge of the lubrication oil from tapered surface 52 as well as a sufficient contact area between tapered surface 52 and metal element 30 via the torque transmitting film.

(2) The surface roughness Ra of tapered surface 52 formed with microgrooves 50 is within the range of 0.05 to 0.25 μm. In this range, it is possible to ensure a good friction coefficient of tapered surface 52 in a stable manner as shown in FIG. 4.

(3) The surface roughness Ra of tapered surface 52 formed with microgrooves 50 is within the range of 0.03 to 0.2 μm. In this range, it is possible to ensure a good friction coefficient of tapered surface 52 in a stable manner as shown in FIG. 4. Further, in this range, as shown in FIG. 6, the variation in surface roughness Ra with passage of time, namely, the Ra variation between before and after the test, is reduced. That is, it is possible to prevent abrasion of the pulley and variation in the surface profile and the surface roughness Ra with passage of time. This stabilizes the friction coefficient that is considerably influenced by the surface roughness Ra as explained above. Furthermore, in the range Ra=0.03-0.2 μm, as shown in FIG. 7, the abrasion amount of the microscopic projections of the metal element is decreased. Therefore, it is possible to suppress abrasion of the pulley and variation in the surface profile and the surface roughness Ra with passage of time and improve abrasion resistance of the metal element.

(4) The height H1 of microprojection 54 on tapered surface 52 is within the range of 0.5 to 2.5 μm. Since the height H1 is adjusted so as to correspond to the above adequate surface roughness Ra, it is possible to ensure a sufficient area on the top surface of microprojection 54, and therefore, increase an area where the torque transmitting film is formed.

(5) The pitch Sm of microgrooves 50 is 30 μm or less. In this range, as shown in FIG. 5, even under the same surface roughness Ra, it is possible to ensure a higher friction coefficient.

(6) The pitch Sm of microgrooves 50 is 20 μm or less. In this range, as shown in FIG. 5, even under the same surface roughness Ra, it is possible to ensure a higher friction coefficient.

(7) The pitch Sm of microgrooves 50 is 15 μm or less. In this range, as shown in FIG. 5, even under the same surface roughness Ra, it is possible to ensure a higher friction coefficient.

(8) Microgrooves 50 are formed such that the relationship between the surface roughness Ra of the tapered surfaces of the pulley and the pitch Sm of the microgrooves is satisfied by the following expression: Ra×Sm/4<1.5 In this range, as shown in FIG. 9, the friction coefficient μ can be considerably enhanced.

(9) Microgrooves 50 are formed on the region of tapered surface 52 where a pulley ratio is 1 or more. Thus, microgrooves 50 are formed on only the region requiring a high friction coefficient, whereby the pulley processing time can be shortened.

This application is based on prior Japanese Patent Application No. 2004-091984 filed on Mar. 26, 2004 and Japanese Patent Application No. 2005-069942 filed on Mar. 11, 2005. The respective entire contents of the Japanese Patent Application Nos. 2004-091984 and 2005-069942 are hereby incorporated by reference.

Although the invention has been described above by reference to embodiments and examples of the invention, the invention is not limited to the embodiments and examples described above. Modifications and variations of the embodiments and examples described above will occur to those skilled in the art in light of the above teachings. The scope of the invention is defined with reference to the following claims.

What is claimed is:

1. A continuously variable belt drive transmission, comprising:

an input pulley having tapered surfaces opposed to each other in an axial direction of the input pulley;

an output pulley having tapered surfaces opposed to each other in an axial direction of the output pulley; and an endless belt including a plurality of metal elements each having opposed side faces contacted with the respective tapered surfaces of the input and output pulleys, each of the opposed side faces being formed with a plurality of microscopic projections and recesses arranged along a radial direction of the input and output pulleys upon being in contact with the respective tapered surfaces of the input and output pulleys, wherein the tapered surfaces of at least the input pulley are formed with microgrooves and microprojections radially spaced respectively from one another, wherein a pitch of the microgrooves is a sum of a width of a respective microprojection and a width of a respective microgroove, wherein the pitch of the microgrooves of the tapered surfaces of at least the input pulley has a value not more than a width of each of the microscopic projections on the side faces of the metal elements.

2. The continuously variable belt drive transmission as claimed in claim 1, wherein the microgrooves are in the form of concentric grooves.

3. The continuously variable belt drive transmission as claimed in claim 1, wherein the microgrooves are in the form of a continuous helical groove.

4. The continuously variable belt drive transmission as claimed in claim 1, wherein the tapered surfaces formed with the microgrooves have a surface roughness Ra ranging from 0.05 μm to 0.25 μm.

5. The continuously variable belt drive transmission as claimed in claim 1, wherein the tapered surfaces formed with the microgrooves have a surface roughness Ra ranging from 0.03 μm to 0.2 μm.

6. The continuously variable belt drive transmission as claimed in claim 1, wherein microprojections are formed between the microgrooves, the microprojections having a height ranging from 0.5 μm to 2.5 μm.

7. The continuously variable belt drive transmission as claimed in claim 1, wherein the pitch of the microgrooves is 30 μm or less.

8. The continuously variable belt drive transmission as claimed in claim 1, wherein the pitch of the microgrooves is 20 μm or less.

9. The continuously variable belt drive transmission as claimed in claim 1, wherein the pitch of the microgrooves is 15 μm or less.

10. The continuously variable belt drive transmission as claimed in claim 1, wherein a relationship between a surface roughness Ra of the tapered surfaces and the pitch of the microgrooves is satisfied by the following expression:

$Ra \times Sm/4 < 1.5$ wherein Sm represents the pitch of the microgrooves.

11. The continuously variable belt drive transmission as claimed in claim 1, wherein the microgrooves are formed in at least a region of the tapered surfaces of at least the input pulley in which a pulley ratio is 1 or more.

12. The continuously variable belt drive transmission as claimed in claim 1, wherein the microgrooves are arranged in a substantially equidistantly spaced relation to one another.

13. The continuously variable belt drive transmission as claimed in claim 1, wherein the width of each of the microprojections is a width of a top surface thereof which extends in the radial direction of the input and output pulleys, the width of each of the microgrooves is a radial distance between the top surfaces of the adjacent microprojections, and the width of each of the microscopic projections on the side faces of the metal element is a width of a top surface thereof which extends in a direction perpendicular to a thickness direction of the metal element.

14. The continuously variable belt drive transmission as claimed in claim 1, wherein the pitch of the microgrooves has a value such that one or more of the microgrooves are opposed to each microscopic projection of the metal elements.

15. A continuously variable belt drive transmission, comprising:

an input pulley having tapered surfaces opposed to each other in an axial direction of the input pulley;

an output pulley having tapered surfaces opposed to each other in an axial direction of the output pulley; and an endless belt including a plurality of metal elements each having opposed side faces contacted with the respective tapered surfaces of the input and output pulleys, each of the opposed side faces being formed with a plurality of microscopic projections and recesses arranged along a radial direction of the input and output pulleys upon being in contact with the respective tapered surfaces of the input and output pulleys, wherein the tapered surfaces of at least the input pulley are formed with microgrooves and microprojections radially spaced respectively from one another, wherein a pitch Sm of the microgrooves is a sum of a width of a respective microprojection and a width of a respective microgroove, wherein the pitch of the microgrooves of the tapered surfaces of the at least the input pulley has a value not more than a width of each of the microscopic projections on the side faces of the metal elements, wherein the pitch Sm of the microgrooves corresponds to a mean value of sample lengths of a mean line of a roughness curve of the tapered surfaces formed with the microgrooves, the sample lengths corresponding to one profile peak and one profile valley adjacent to the one profile peak, and wherein a surface roughness Ra of the tapered surfaces formed with the microgrooves corresponds to a mean value of absolute values of a deviation from the mean line of the roughness curve.

16. The continuously variable belt drive transmission as claimed in claim 15, wherein the microgrooves are in the form of concentric grooves.

17. The continuously variable belt drive transmission as claimed in claim 15, wherein the microgrooves are in the form of a continuous helical groove.

18. The continuously variable belt drive transmission as claimed in claim 15, wherein the tapered surfaces formed with the microgrooves have a surface roughness Ra ranging from 0.05 μm to 0.25 μm.

19. The continuously variable belt drive transmission as claimed in claim 15, wherein the pitch of the microgrooves is 15 μm or less.

20. The continuously variable belt drive transmission as claimed in claim 15, wherein a relationship between a surface roughness Ra of the tapered surfaces and the pitch of the microgrooves is satisfied by the following expression:

$Ra \times Sm/4 < 1.5$ wherein Sm represents the pitch of the microgrooves.

* * * * *